United States Patent [19]

Thorsted, Jr.

[11] Patent Number: 4,842,667
[45] Date of Patent: Jun. 27, 1989

[54] EPOXY RESIN SYSTEM AND PULTRUSION PROCESS EMPLOYING SAME

[75] Inventor: Ted H. Thorsted, Jr., Moorpark, Calif.

[73] Assignee: Lockheed Corporation, Calabasas, Calif.

[21] Appl. No.: 109,688

[22] Filed: Oct. 19, 1987

Related U.S. Application Data

[62] Division of Ser. No. 946,995, Dec. 29, 1985, Pat. No. 4,754,015.

[51] Int. Cl.$^4$ ............... B29C 35/02; B29K 63/00; B32B 31/12
[52] U.S. Cl. ............................. 156/166; 156/180; 156/245; 156/330; 264/137; 264/258; 264/263
[58] Field of Search ............... 156/166, 180, 181, 245, 156/330; 264/137, 258, 263; 528/94, 98, 115

[56] References Cited

U.S. PATENT DOCUMENTS

| | | | |
|---|---|---|---|
| 3,684,622 | 8/1972 | Goldsworthy | 156/180 |
| 3,960,629 | 6/1976 | Goldsworthy | 156/180 |
| 4,168,194 | 9/1979 | Stiles | 156/166 |
| 4,394,496 | 7/1983 | Schrader | 528/98 |
| 4,594,291 | 6/1986 | Bertram | 528/98 |
| 4,654,382 | 3/1987 | Hiza | 528/98 |
| 4,672,103 | 6/1987 | Wang | 528/98 |
| 4,684,700 | 8/1987 | Wang | 528/98 |

FOREIGN PATENT DOCUMENTS

0933993 8/1963 United Kingdom ............... 156/180

Primary Examiner—Michael W. Ball
Assistant Examiner—J. Davis
Attorney, Agent, or Firm—Max Geldin

[57] ABSTRACT

An epoxy resin system is disclosed which is especially adapted for use in the pultrusion process. Such resin system comprises tris (hydroxyphenyl) methane-based epoxy resin and a combination of the cross-linking agents (methyl)-bicyclo(2,2,1) heptane-2,3-dicarboxylic anhydride and poly sebacic poly anhydride, the ratio of the dicarboxylic anhydride to the total amount of cross-linking agents ranging from 0.65 to 0.80 and the ratio of the poly anhydride to the total amount of cross-linking agents ranging from 0.35 to 0.20. The amount of total cross-linking agents to epoxy resin ranges from about 60 to about 80 parts total cross-linking agents, per 100 parts resin, by weight. A small amount of an imidazole accelerator, preferably 2-ethyl-4 methyl imidazole, is included. The pultrusion process includes the steps of creeling a plurality of fabric bands or individual fiber tows, collating the creeled bands, passing the array of collated bands through the above epoxy resin system heated in a wet-out tank, passing the wetted array of fabric bands through a forming guide to form a resin impregnated laminate, passing the laminate through a heated pultrusion die, and discharging a continuous length of cured fiber-epoxy composite from the die.

13 Claims, 1 Drawing Sheet

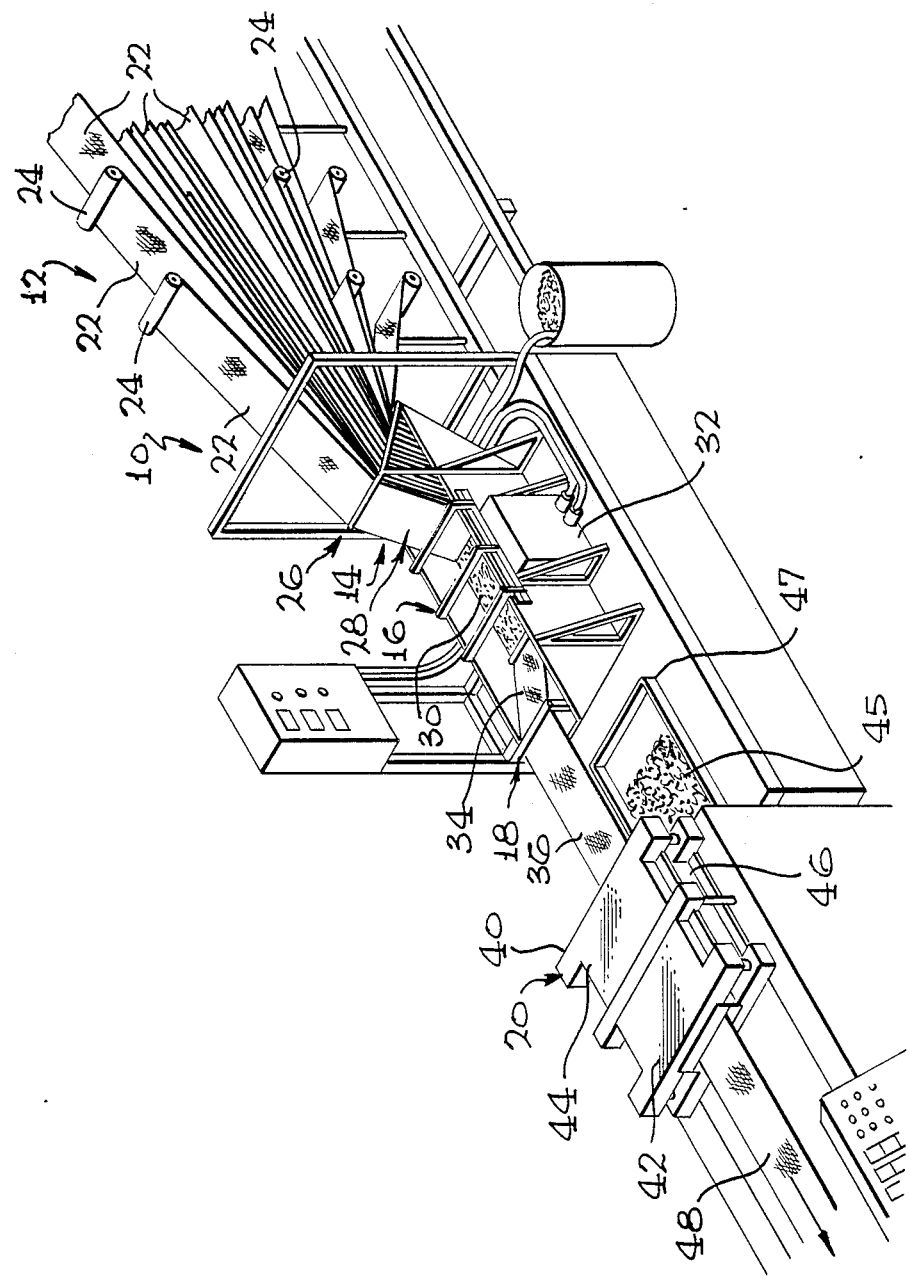

EPOXY RESIN SYSTEM AND PULTRUSION PROCESS EMPLOYING SAME

This is a divisional of copending application(s) Ser. No. 946,995 filed on Dec. 29, 1985, now U.S. Pat. No. 4,754,015.

BACKGROUND OF THE INVENTION

The present invention relates to the production of composites and is particularly concerned with an epoxy resin system applicable for use in the pultrusion process for fabricating composite structures especially useful in the aircraft and aerospace industries.

Structural components particularly advantageous for aircraft, as well as other vehicles, e.g., in the form of beams, ribs and other structural components, including "J" stiffeners, "C" channels, and "I" beams, are often made of lightweight material relative to their strength and stiffness. Such materials are composite materials which, as is well known in the art, are comprised of fibers of various types, such as graphite fibers in cloth and/or tape orientations, impregnated with a binder material, usually a plastic, such as an epoxy resin.

Presently, the manufacture of composite structures, such as leading and trailing edges, stiffeners and wing and tail structures, in the aircraft industry involves expensive labor intensive processes. While it is desirable to reduce such costs, the problem is that most aerospace applications involve low volume and "one of a kind" design criteria, which are not readily amenable to automation. Thus, although automation technologies have been used in other industries, they have not been applied to any substantial extent in the aerospace industry.

Various technologies have been examined for their applicability to aerospace composite structure manufacturing. These include injection molding, thermoplastic forming processes, transfer molding and pultrusion. These technologies have been used extensively in the automotive, computer/electronic and construction industries. Thermoplastic forming techniques using polycarbonate and similar non-structural thermoplastics have been widely used in commercial aircraft interiors.

High temperature thermoplastic forming is now being employed fairly extensively in the aerospace industry. The leading thermoplastics, polyether ether ketone (PEEK) and polyphenylene sulfide (PPS) in such process have high forming temperatures, 750° F. and 650° F., respectively, which require expensive high temperature tools and equipment. In addition, their high melt viscosities make processing more difficult. These materials can be formed more readily using injection molding. However, this process is only feasible for small, high volume parts since the cost of injection molding equipment is quite expensive.

Resin transfer molding is a technology which has not been developed as yet to any substantial degree in the aerospace industry. This process does not require expensive initial costs for equipment, as with injection molding, and can be an inexpensive method for producing one-of-a-kind composite structures.

However, pultrusion is an ideal process for producing constant cross-section members, such as C-channels, I-beams, hat sections, J-sections and the like, in an automatic manner. The pultrusion process involves the steps of creeling long runs of fabric or individual fiber tows of glass, graphite or Kevlar fiber, such as graphite roving, to order the various layers of fabric, collating or assembling the various layers together, wetting out the collated fabric with a suitable impregnating resin in wetout tanks, forming the assembly of resin impregnated tows of fabrics by passing through shaping forms and then passing the resulting formed resin impregnated fabric assembly through a pultrusion die. The die is heated to a predetermined temperature along the length of the die to effect curing of the resin during passage through the die. In the pultrusion die, a pulling together of the fibers or layers of the fabric occurs, and the curing of the resin in the die forms a pultruded cross-section.

Although the pultrusion process is an attractive economic automatic procedure which permits the production of structural parts and complex shapes, particularly in the aerospace industry, at a lower cost, and affords less fiber distortion, thus increasing structural strength, the selection of matrix resins suitable for pultrusion has presented a significant problem. Polyester resins, vinyl esters and certain epoxy resins have been tried in the pultrusion process. However, all of these resins have not exhibited the mechanical properties applicable to aerospace applications.

Epoxies as a group have the disadvantage of requiring long cure cycles to achieve acceptable engineering properties, and epoxies tend to expand through gellation. Successful pultrusion as a process requires very fast kinetic rates of resin cure (less than three minutes), long pot life at elevated temperature and viscosity profile windows low enough to wet out fibers but not high enough to flow away from fibers in the pultrusion die.

It is accordingly an object of the present invention to provide a viable epoxy resin system for use in a pultrusion process for production of composites.

Another object is the provision of an improved epoxy resin system for use in a pultrusion process, having fast cure rate, long pot life at elevated temperature and suitable viscosity profile, and providing a highly reactive predictable reaction rate, resulting in low cost production of composites having good mechanical properties.

A still further object is the provision of an improved pultrusion process for producing epoxy composite structures, particularly in the aircraft industry, rapidly and at low cost.

SUMMARY OF THE INVENTION

According to the invention, a unique viable epoxy resin system especially adapted for use in the pultrusion process for the production of composite structures is provided, comprising a specific epoxy resin and a combination of certain cross-linking or curing agents in a certain range of ratios with respect to each other, and in a certain range of ratios of total cross-linking agents to epoxy resin, as described in greater detail hereinafter.

The epoxy resins found particularly suitable for purposes of the invention are the tris (hydroxyphenyl) methane based epoxy resins. A combination of certain cross-linking agents is employed in conjunction with such epoxy resins to obtain the properties of the resin system required for efficient pultrusion processing, consisting of (methyl)-bicyclo (2,2,1) heptane-2,3-dicarboxylic anhydride and poly sebacic poly anhydride.

To provide a viable pultrusion process for producing epoxy composites, the ratio of the respective anhydride cross-linking agents to the total amount of cross-linking agents and the ratio of the total amount of cross-linking agents to epoxy resin should be effective to provide a resin system having a pot life of at least 3 hours at 70° C., a cure rate of less than 3 minutes at elevated curing temperature, and a viscosity profile of less than 2500 cps at 70° C. and greater than 100 cps at 120° C. In preferred practice, the epoxy resin system has a shelf life of at least 1 week at ambient temperature and does not expand on gelling.

Thus, the above resin system has very fast kinetic rates to cure, usually less than three minutes, long pot life at elevated temperature and viscosity profile windows low enough to wet out fibers but high enough not to cause flow away of resin from the fibers in the pultrusion die. The use of such resin system in the pultrusion process permits rapid pultrusion at a sustained rate of pultruded composite, such as graphite-epoxy composite structures, particularly suitable for use in the aircraft and aerospace industry.

BRIEF DESCRIPTION OF THE DRAWING

The invention will be described in greater detail below, taken in conjunction with the accompanying drawing which illustrates the pultrusion process employing the epoxy resin system of the invention for production of composite structural components.

DETAILED DESCRIPTION OF THE INVENTION AND PREFERRED EMBODIMENTS

The epoxy resin system for the production of composites by the pultrusion process is a chief novel feature of the invention. A number of resin systems were investigated, including epoxy and other resins, such as poly phenylene sulfide and polyether ether ketone (PEEK resin). However, it was found that the only resin which met the above-noted criteria for successful pultrusion in the production of composites, when used in conjunction with certain cross-linking agents, in relation to obtaining fast cure, together with suitable viscosity characteristics and long pot life, is the tris (hydroxyphenyl) methane-based epoxy resins marketed by Dow Chemical Company as Tactix 742 epoxy resin. This resin has the following properties:

TABLE I

| Epoxide equiv. wt. | 162 |
| --- | --- |
| Softening Point | 52° C. |
| Volatiles wt. % | 0.35 |
| Viscosity, cps. @ 150° C. | 40 |

Of all of the various resins tried, the above-noted epoxy resin was one of the few which did not expand on gelation. In the pultrusion process, if the epoxy resin expands during cure, it poses serious processing problems to be successfully pultruded in a pultrusion die.

In conjunction with the above epoxy resin, there is employed a combination of two cross-linking or curing agents, one of which is (methyl)-bicyclo(2,2,1) heptane-2,3-dicarboxylic anhydride, marketed as AC-Methyl, by Anhydrides and Chemicals, Inc., Newark, N.J. This material is equivalent to Nadic methyl anhydride and has the following properties:

TABLE II

| Molecular wt. | 178 |
| --- | --- |
| Specific gravity @ 25° C. | 1.23 |
| Viscosity, cps. | 150–300 |

TABLE II-continued

| @ 25° C. | |
| --- | --- |

The second cross-linking agent employed, together with the above-noted cross-linker, is poly sebacic poly anhydride. This material is the 1,8-octane dicarboxcylic anhydride derived from the sebacic acid. This material, marketed as PSPA by Anhydrides and Chemicals, Inc., has the following properties:

TABLE III

| Molecular wt. | 1600–1700 |
| --- | --- |
| Specific gravity @ 80–85° C. | 1.10 |
| Melting Point °C. | 72–82 |
| % Anhydride | 34.0 |
| % Free Acid | 5.0 |

An imidazole accelerator, preferably 2-ethyl-4 methyl imidazole, is employed in conjunction with the above-noted cross-linking agents in the epoxy resin system of the invention. Such imidazole accelerator, marketed as AC-PI by Anhydrides and Chemicals, Inc., has the following properties:

TABLE IV

| Molecular wt. | 110 |
| --- | --- |
| Specific gravity @ 20° C. | 1.02 |
| Melting Point °C. | −10 |

It has been found that the ratio of the bicyclo heptane anhydride (AC-methyl) to total cross-linking agents should range from 0.65 to 0.80. The ratio of the second cross-linking agent, the sebacic poly anhydride, PSPA, will vary reflexibly with the amount of the first AC-methyl cross-linker. Thus, the range of ratios of the second cross-linker to the total cross-linking agents will range from 0.35 to 0.20, so that when the ratio of the first cross-linker to total cross-linking agents employed is, for example, 0.70, the ratio of the second cross-linker to the total cross-linking agents will be 0.30. It has been found that as the ratio of PSPA to AC-methyl increases, the reactivity of the reaction with the epoxy resin increases substantially, so that with a PSPA to the total cross-linker ratio above 0.35, the reactivity of both cross-linkers with the epoxy is such that there is substantially no pot life in the resin mixture. If the ratio of PSPA to total cross-linking agents is reduced substantially, that is, below 0.20, then the reactivity of the cross-linking agents with the epoxy is insufficient to permit sufficient curing in the pultrusion die at acceptable rates of production.

In conjunction with the above-noted ranges of ratios of AC-methyl and PSPA to total cross linking agents, the ratio of total cross-linking agents to the above epoxy resin should range from about 60 to about 80 parts total cross-linking agents, per 100 parts resin, by weight.

The above-noted accelerators are employed in small amounts based on epoxy resin, e.g., from about 0.01% to about 0.50%, by weight of the epoxy resin. The accelerator, however, is an optional component in the epoxy formulation of the invention.

A preferred epoxy formulation for use in a pultrusion process to produce composites having good mechanical properties is as follows:

| COMPOSITION A | |
|---|---|
| Components | Parts by Wt. |
| TACTIX (epoxy resin) | 58.8 |
| AC-METHYL cross-linker | 28.84 |
| PSPA cross-linker | 12.36 |
| AC-PI imidazole accelerator | .147 |

It is noted that the above composition contains a ratio of the AC-METHYL cross-linker to total cross-linking agents of 0.7, and a ratio of PSPA cross-linker to total cross-linking agents of 0.3. The ratio of total cross-linking agents to epoxy resin in 70 parts per 100 parts resin, by weight.

Additional epoxy compositions within the scope of the invention are set forth below:

TABLE V

| | Compositions Parts by Weight | | | | |
|---|---|---|---|---|---|
| Components | B | C | D | E | F |
| TACTIX (epoxy resin) | 58.8 | 58.8 | 58.8 | 58.8 | 58.8 |
| AC-METHYL cross-linker | 22.93 | 28.22 | 30.58 | 37.63 | 27.9 |
| PSPA cross-linker | 12.35 | 7.06 | 16.40 | 9.41 | 15.02 |
| AC-PI imidazole accelerator | .147 | .147 | .147 | .147 | .147 |

In each of the above compositions B to F, the ratios of AC-methyl and PSPA to total cross-linking agents and the ratio of total cross-linking agents to the epoxy resin are within the ranges noted above.

The pultrusion process employing the epoxy resin systems of the invention is illustrated in the drawing, wherein numeral 10 indicates generally the pultrusion apparatus. This apparatus includes a creeling section 12, a collating section 14, a wet-out tank 16, a forming device 18, and a pultrusion die 20.

In the pultrusion process, bands of graphite roving indicated at 22 are fed from feed rolls 24 through a collating device 26. In place of graphite, any suitable woven or non-woven fabric or individual fiber tows can be employed, such as fiberglass, boron, or organic fibers, such as polyamide, e.g., the material marketed as Kevlar. The bands or layers of fabric 22 can be oriented in various directions, such as 0°, 45° and 90° C. The creeling step thus places the bands of fabric 22 in a predetermined order, and the collating mechanism 26 aligns the creeled fabric bands together to form an orderly array 28 of bands 22 which, although positioned close to each other, are separated so that when the array enters the wet-out tank 16, the fabric or graphite bands will have both sides of their entire surface area exposed to the epoxy resin system 30 in the wet-out tank. The epoxy resin system of the invention is heated in the wet-out tank to a temperature ranging from about 70° C. (158° F.) to about 80° C. (176° F.) by means of the heating element 32 containing insulated electrical heating coils (not shown). The array of fabric bands 28 then passes through the heated epoxy resin system 30 in the wet-out tank to wet and impregnate the graphite bands with the resin system.

The wetted and epoxy impregnated array of fabric bands leaving the wet-out tank at 34 pass through the former 18 which forms the resin impregnated bands 22 into a laminate 36 of closely spaced wetted bands which then enter the pultrusion die 20. In the arrangement shown in the drawing, there are two zones, a front zone 40 and a back zone 42, each of which is comprised of a top platen 44 and a bottom platen 46. As the impregnated laminate at 36 passes into the front section 40 of the die, excess resin 45 is squeezed out and drips into a pan at 47. In one embodiment, the pultrusion die 20 from front to back can be three feet long. The internal temperature of the first zone 40 can be maintained at 320° F., and the internal temperature of the second zone 42 at 360° F. With a three-foot-long pultrusion die, the curing of the epoxy resin system impregnated into the fabric bands 22 can take place 28" to 30" into the die. The peak exotherm reached during curing can be about 380° F. In the pultrusion die, pressure is induced on the laminate through the chemical reaction, and the pulling together of fibers in the fabric band and the curing of the resin in the die form the protruded cross-section.

The amount of resin to be impregnated into the fabric in the wet-out tank is determined by the desired fiber-resin content of the final cured composite 48 exiting the pultrusion die 20.

If, for example, the final composite is to contain 60% fiber and 40% cured resin, an excess amount of resin is impregnated into the fabric bands or rovings passing through the wet-out tank, so that when the excess resin is squeezed out of the impregnated laminate as it enters the pultrusion die, there is a 60/40 mix of fiber to resin in the impregnated fabric entering the pultrusion die. Compression of the laminate occurs when the laminate is forced into the die, resulting in a debulking of the fiber. Thus, the fabric is being compressed down into the die and the voids in the fabric are filled in with resin.

The following is an example of practice of the invention process:

The pultrusion process described above in relation to the drawing was carried out using graphite rovings or bands 22 and epoxy Composition A above as the liquid resin system in the wet-out tank 16.

The epoxy resin system of Composition A had a 2 minute gel time, a predictable and rapid reaction rate of 245±25 joules per gram, at least a 3 hour pot life at 70° C., a viscosity profile less than 2500 cps at 70° C. and greater than 100 cps at 120° C., and a shelf life of at least 1 week at ambient temperature. The resin does not expand on gelling and comes to near completion of cure at about a foot a minute during passage of the impregnated fabric through the pultrusion die.

Fifty linear feet of a trailing edge graphite-epoxy composite material containing 69% graphite and 31% epoxy resin was produced in the above process. Such composite had good structural strength and toughness as well as other good mechanical and physical properties.

The composite of this example was tested for a design allowable shear strength of 3000 psi. The average shear value for the pultruded trailing edge produced in this example was 3505 psi.

Additional test data obtained on the pultruded composite of the above example and on other pultruded parts made from the same resin system are as follows.

For one set of test coupons:

| Tension | 186.4 ksi |
|---|---|
| Modulus | 19.4 msi |

For a second set of test coupons:

| Open hole tension | 56.9 ksi |
|---|---|
| Modulus | 7.6 msi |

For a third set of test coupons:

| Open hole compression | 44.9 ksi |
|---|---|
| Modulus | 7.24 msi |

From the foregoing, it is seen that the invention provides a novel balanced epoxy resin system for use in the pultrusion process for the production of composites, particularly for the fabrication of composite structures or generic shapes, such as "J" stiffeners, "C" channels, and "I" beams, in the aircraft industry. The provision of such epoxy resin composition and its use in the pultrusion process render the pultrusion procedure a viable method for the production of composites. However, the epoxy resin system of the invention can also be successfully utilized in the conventional lay-up systems for producing composite structures.

Since various changes and modifications of the invention will occur to, and can be made readily by those skilled in the art without departing from the invention concept, the invention is not to be taken as limited except by the scope of the appended claims.

What is claimed is:

1. A pultrusion process for the production of fiber-resin composite which comprises:
   creeling a plurality of fabric bands,
   collating said creeled bands to align same and form an array of closely spaced but separated bands,
   passing said array of collated bands through a heated epoxy resin system in a wet-out tank to wet and impregnate said array, said system comprising a tris (hydroxyphenyl) methane based epoxy resin and a combination of the cross-linking agents (methyl)-bicyclo (2,2,1) heptane-2,3-dicarboxylic anhydride and poly sebacic poly anhydride, and a small amount of an imidazole accelerator, the ratio of said respective cross-linking agents to the total amount of cross-linking agents, and the total amount of cross-linking agents to resin, being effective to provide a resin system having a pot life of at least 3 hours at 70° C., a cure rate of less than 3 minutes at elevated temperature, and a viscosity profile less than 2500 cps at 70° C. and greater than 100 cps at 120° C.,
   passing said wetted and impregnated array of fabric bands through a forming guide which forms said last mentioned array into a resin impregnated laminate,
   passing said laminate through a heated pultrusion die, the rate of passage of said laminate through said die being sufficient to cure the resin in said laminate during said passage, and
   discharging a continuous length of cured fiber-epoxy composite from said die.

2. The pultrusion process of claim 1, including the step of squeezing out excess resin system from said resin impregnated laminate as it enters the heated pultrusion die.

3. The pultrusion process of claim 2, the temperature of said heated epoxy resin system in said wet-out tank ranging from about 70° C. to about 80° C.

4. The pultrusion process of claim 2, the internal temperature of said pultrusion die ranging from about 320° F. to about 360° F.

5. The pultrusion process of claim 4, said pultrusion die having a first zone and a second zone, said first zone being heated to a temperature of about 320° F. and said second zone to a temperature of about 360° F.

6. The pultrusion process of claim 1, said fabric bands being comprised of a woven or non-woven fabric selected from the group consisting of graphite, fiberglass, boron and polyamide fibers.

7. The pultrusion process of claim 6, said fabric bands being comprised of graphite, and forming a graphite-epoxy composite.

8. The pultrusion process of claim 1, the ratio of said dicarboxylic anhydride to the total amount of cross-linking agents ranging from 0.65 to 0.80, and the ratio of said poly anhydride to the total amount of cross-linking agents ranging from 0.35 to 0.20.

9. The pultrusion process of claim 8, the ratio of total cross-linking agents to epoxy resin ranging from about 60 to about 80 parts total cross-linking agents, per 100 parts resin, by weight.

10. The pultrusion process of claim 9, the ratio of said dicarboxylic anhydride to the total amount of cross-linking agents being 0.7 and the ratio of said poly anhydride to the total amount of cross-linking agents being 0.3, said imidazole accelerator being 2-ethyl-4 methyl imidazole, said fabric bands being comprised of a woven or non-woven fabric selected from the group consisting of graphite, fiberglass, boron and polyamide fibers.

11. The pultrusion process of claim 10, said fabric bands being comprised of graphite, and forming a graphite-epoxy composite.

12. A pultrusion process for the production of fiber-resin composite which comprises:
    creeling a plurality of fabric bands,
    collating said creeled bands to align same and form an array of closely spaced but separated bands,
    passing said array of collated bands through a heated epoxy resin system in a wet-out tank to wet and impregnate said array, said system comprising a tris (hydroxyphenyl) methane based epoxy resin and a combination of the cross-linking agents (methyl)-bicyclo (2,2,1) heptane-2,3-dicarboxylic anhydride and poly sebacic poly anhydride, and a small amount of an imidazole accelerator, the ratio of said dicarboxylic anhydride to the total amount of cross-linking agents ranging from 0.65 to 0.80, and the ratio of said poly anhydride to the total amount of cross-linking agents ranging from 0.35 to 0.20, the ratio of total cross-linking agents to epoxy resin ranging from about 60 to about 80 parts total cross-linking agents, per 100 parts resin, by weight,
    passing said wetted and impregnated array of fabric bands through a forming guide which forms said last mentioned array into a resin impregnated laminate,
    passing said laminate through a heated pultrusion die, the rate of passage of said laminate through said die being sufficient to cure the resin in said laminate during said passage, and
    discharging a continuous length of cured fiber-epoxy composite from said die.

13. The pultrusion process of claim 12, the ratio of said dicarboxylic anhydride to the total amount of cross-linking agents being 0.7 and the ratio of said poly anhydride to the total amount of cross-linking agents being 0.3, employing about 70 parts total cross-linking agents per 100 parts resin, by weight.

* * * * *